United States Patent [19]

Brandt

[11] Patent Number: 5,380,432
[45] Date of Patent: Jan. 10, 1995

[54] FUEL FILTER WITH ELECTROSTATIC CHARGE PREVENTING MEDIA

[75] Inventor: Timothy B. Brandt, West Des Moines, Iowa

[73] Assignee: Parr Manufacturing, Inc., Des Moines, Iowa

[21] Appl. No.: 62,423

[22] Filed: May 13, 1993

[51] Int. Cl.⁶ .................. B01D 35/06; B01D 27/08; B01D 35/30; B01D 39/16
[52] U.S. Cl. ..................... 210/243; 210/443; 210/505; 210/508; 210/509; 204/302; 361/212; 361/214; 361/220
[58] Field of Search ............. 210/243, 443, 503, 504, 210/505, 508, 509, 416.4; 204/302; 361/214, 212, 220

[56] References Cited

U.S. PATENT DOCUMENTS

| | | |
|---|---|---|
| 1,505,523 | 8/1924 | Adler . |
| 2,369,857 | 2/1945 | Russell . |
| 2,494,884 | 1/1950 | Lassmann . |
| 2,597,475 | 5/1952 | Grise . |
| 2,865,442 | 12/1958 | Halford . |
| 3,186,551 | 6/1965 | Dornauf . |
| 3,246,767 | 4/1966 | Pall . |
| 3,362,534 | 1/1968 | Kay . |
| 3,870,637 | 3/1975 | Miyoshi . |
| 3,929,641 | 12/1975 | Dukek . |
| 3,933,643 | 1/1976 | Colvin et al. . |
| 3,943,273 | 3/1976 | de Putter . |
| 4,017,397 | 4/1977 | Copeland . |
| 4,081,373 | 3/1978 | Rozniecki . |
| 4,187,179 | 2/1980 | Harms . |
| 4,196,464 | 4/1980 | Russell . |
| 4,211,639 | 7/1980 | Jackson . |
| 4,276,161 | 6/1981 | Matsui . |
| 4,312,753 | 1/1982 | Bell . |
| 4,319,303 | 3/1982 | Thorn . |
| 4,322,232 | 3/1982 | Beane . |
| 4,378,322 | 3/1983 | Atterbury et al. . |
| 4,512,882 | 4/1985 | Fischer . |
| 4,512,884 | 4/1985 | Wheatley . |
| 4,664,971 | 5/1987 | Soens . |
| 4,675,143 | 6/1987 | Wakita et al. . |
| 4,686,071 | 8/1987 | Rosenzweig et al. . |
| 4,758,350 | 7/1988 | Pitts . |

(List continued on next page.)

FOREIGN PATENT DOCUMENTS

| | | |
|---|---|---|
| 1127093 | 7/1982 | Canada . |
| 0176866 | 9/1985 | European Pat. Off. . |
| 1541025 | 4/1968 | France . |
| 3918342 | 6/1990 | Germany . |
| 55-165114 | 12/1980 | Japan . |
| 59-173113 | 10/1984 | Japan . |
| 2140473 | 11/1984 | United Kingdom . |

OTHER PUBLICATIONS

Copy of Article—pp. 383–394 from Journal of Colloid and Interface Science, vol. 32, No. 3, Mar. 1970 and entitled Effect of Conductivity on Charge Generation in Hydrocarbon Fuels Flowing Through Fiber Glass Filters[1].

Primary Examiner—Thomas M. Lithgow
Attorney, Agent, or Firm—Henderson & Sturm

[57] ABSTRACT

A fuel filter having a housing made of an electrically non-conductive material has a chamber disposed within the housing and the housing has an inlet and an outlet both in communication with the chamber. A filter media is disposed inside the chamber and is fluidly disposed between the inlet and the outlet for filtering non-polar substances such as fuel for internal combustion engines or the like. The filter media includes conductive fibers for preventing the buildup of or generation of electrostatic charges which would otherwise be generated by passage of fuel through standard paper filters such as those used almost universally in the automotive industry. These conductive fibers are preferably carbon fibers which consist of approximately two percent (2%) of the entire filter media.

7 Claims, 1 Drawing Sheet

U.S. PATENT DOCUMENTS 4,776,962 10/1988 Wakeman .
4,812,247 3/1989 Fahner et al. .
4,895,640 1/1990 Jackson .
4,948,515 8/1990 Okumura et al. .
4,999,108 3/1991 Koch et al. .
5,049,271 9/1991 Cain .
5,076,920 12/1991 Danowski et al. .
5,081,326 1/1992 Usui .
5,085,773 2/1992 Danowski .
5,151,198 9/1992 McCullough, Jr. et al. .
5,164,084 11/1992 Danowski et al. .
5,164,879 11/1992 Danowski et al. .
5,183,546 2/1993 Oren .
5,196,115 3/1993 Andelman .
5,213,882 5/1993 Sassa .
5,229,200 7/1993 Sassa .
5,281,330 1/1994 Oikawa .

FUEL FILTER WITH ELECTROSTATIC CHARGE PREVENTING MEDIA

TECHNICAL FIELD

The present invention relates generally to fuel filters and more particularly to fuel filters having a housing of electrically non-conductive material with a fuel filter media disposed therein for preventing the generation of electrostatic charges which otherwise may build up inside of the electrically non-conductive housing.

BACKGROUND ART

In the past, fuel filter bodies have mainly been made of a metal substance. Consequently, any electrostatic charges that were made by the fuel passing through the filter media would merely be dissipated through the metallic casing or housing, which was grounded to the vehicle chassis.

In more recent years, some fuel filters have been constructed of electrically non-conductive material such as nylon. It was discovered that electrostatic charges build up on the inside of these non-conductive housings and that under certain circumstances, the charges built up to the point that there was arcing through the housing itself, which in extreme instances actually formed a hole through the housing which caused the housing to leak fuel. U.S. Pat. Nos. 5,164,018; 5,164,879 and 5,076,920 all to Danowski et al propose to solve this buildup of electrostatic charges problem by putting stainless steel fibers in the housing itself and grounding the housing to the vehicle chassis. The problem has also been solved somewhat unwittingly by FIG. 3 of French Patent No. 1,541,025, published Oct. 4, 1969, wherein metallic materials were incorporated into filters for fuels for the purpose of dissipating heat.

The prior art consequently allows the problem to occur and then shows a way to alleviate the problem of electrostatic buildup of charges in a fuel filter housing. Consequently, there is a need for a solution to this problem which prevents the generation of such electrostatic charges within a fuel filter, instead of allowing the charges to generate and then to provide a path to ground as in prior art solutions.

DISCLOSURE OF THE INVENTION

The present invention relates generally to a fuel filter having a housing made of an electrically non-conductive material. A chamber is disposed within the housing and the housing has an inlet and an outlet both in communication with the chamber. A filter media is disposed inside the chamber and is fluidly disposed between the inlet and the outlet for filtering non-polar substances such as fuel for internal combustion engines or the like. The filter media includes conductive fibers for preventing the buildup of or generation of electrostatic charges which would otherwise be generated by passage of fuel through standard paper filters, such as those used almost universally in the automotive industry. These conductive fibers are preferably carbon fibers which consist of approximately two percent (2%) of the entire filter media.

An object of the present invention is to provide a fuel filter having an electrically non-conductive housing and a filter media for preventing the generation of electrostatic charges as the fuel passes therethrough.

Another object of the present invention is to avoid the necessity to ground the housing of a non-conductive filter housing by preventing the generation of electrostatic charges as fuel flows through the filter media.

Other objects, advantages, and novel features of the present invention will become apparent from the following detailed description of the invention when considered in conjunction with the accompanying drawings.

BEST MODE FOR CARRYING OUT THE INVENTION

Figure 1:
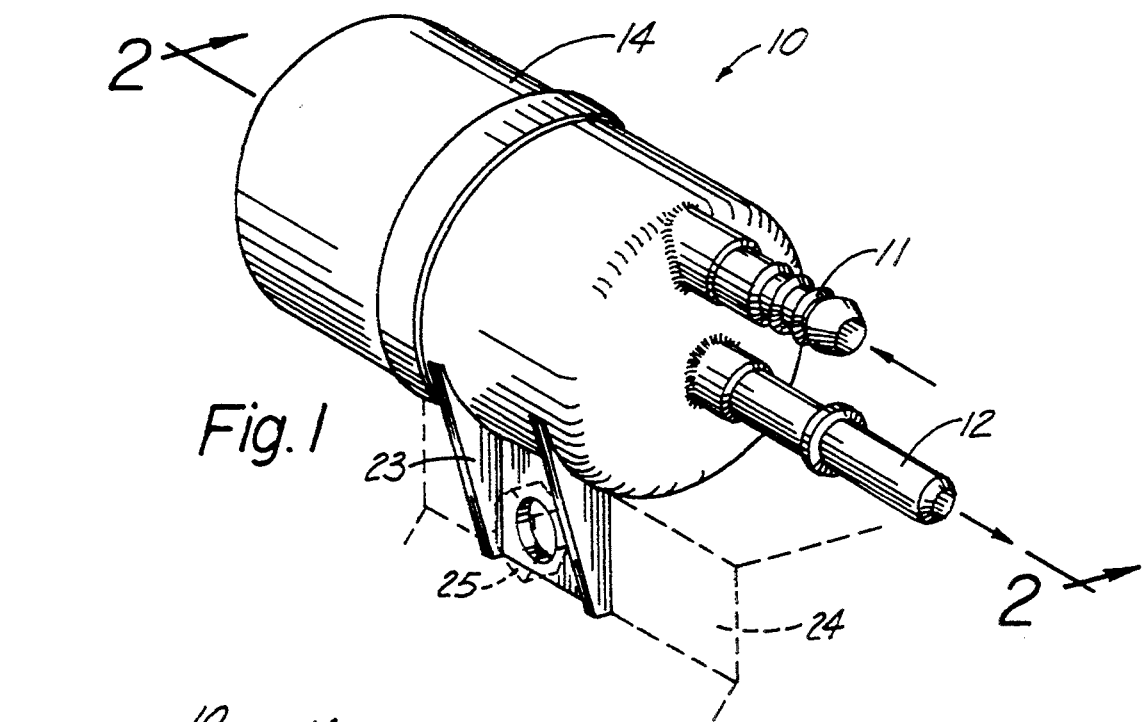
FIG. 1 is a perspective view of a fuel filter constructed in accordance with the present invention.
Figure 2:
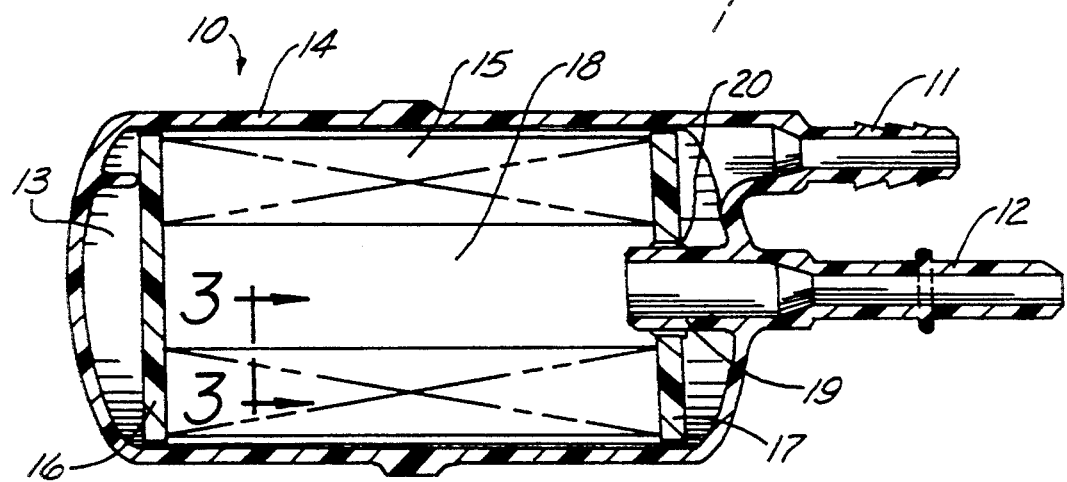
FIG. 2 is a cross sectional view taken along line 2—2 of FIG. 1.

Referring now to the drawings wherein like reference numerals designate identical or corresponding parts throughout the several views, FIG. 1 shows a fuel filter (10) constructed in accordance with the present invention. The housing (10) is constructed of nylon or some other plastic material of a non-conductive type. Integrally formed onto the housing (10) is an inlet connector (11) and an outlet connector (12) leading to and from a filter chamber (13) within the housing (14) of the fuel filter (10). Flange (23) is integrally formed with housing body (14) and is bolted to a vehicle engine bracket (24) by bolt (25).

An annular accordion pleat filter media (15) is attached to end plates (16) and (17) so that all of the flow from inlet (11) must first pass through the filter media (15) before it can enter chamber (18) to pass out through outlet (12). Portion (19) of the outlet tube (12) is sealed by a seal (20) around an opening in plate (17) to assure that all of the fuel from the inlet first goes through the filter media (15) before it exits outlet tube (12).

Figure 3:
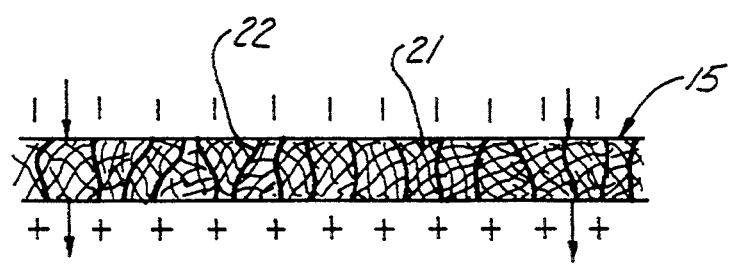
FIG. 3 is a partial cross sectional view taken along line 3—3 of FIG. 3 showing a cross section through the filter media.

Filter media (15) shown in FIG. 3 is constructed of matted cellulose fibers (21) which are the thin fibers shown in FIG. 3. Randomly mixed with the thin cellulose fibers (21) are thicker carbon fibers (22) which serve to provide a conducting path from the inlet side of the paper filter (15) to the outlet side of the filter paper (15). In FIG. 3, negative charges are shown on the inlet side of the filter paper (15) and positive charges are shown on the downstream side of the paper filter (15), but this is merely shown for illustrative purposes to show what would happen if regular paper filter is used. But because of the carbon fibers (22) dispersed through the paper filter (15), the electrons on the negative side are not stripped off as the fuel or non-polar liquid passes through the paper filter as is normally the case. Instead, these electrons merely flow through the carbon fibers (22) to the positive downstream side of the paper filter (15) and this electrical potential which would ordinarily be created across a normal paper filter is eliminated entirely.

Obviously, many modifications and variations of the present invention are possible in light of the above teachings. For example, other fibers such as stainless steel fibers could be substituted for the carbon fibers (22) shown in FIG. 3. It is therefore to be understood that, within the scope of the appended claims, the invention may be practiced otherwise than as specifically described.

I claim:

1. A fuel filter comprising:
    a non-conductive housing made primarily of an electrically non-conductive material;
    means for providing a chamber within said housing for receiving a non-polar fluid;
    inlet means attached to said housing for permitting fuel under pressure to enter said chamber;
    outlet means attached to said housing for permitting fuel to flow from said chamber; and
    filter media located in said chamber and being fluidly disposed between said inlet means and said outlet means for filtering the fluid passing through said chamber, wherein said filter media means comprises means for conducting electricity from the upstream side thereof to the downstream side thereof to prevent the generation of electrostatic charges as said fluid flows through said filter media.

2. The fuel filter of claim 1 wherein said filter media has elongated conductive fibers disposed therein.

3. The fuel filter of claim 2 wherein said filter media is constructed of cellulose with said elongated conductive fibers disposed therein.

4. The fuel filter of claim 3 wherein said elongated conductive fibers are carbon.

5. The fuel filter of claim 4 wherein the amount of said carbon fibers in the filter media is in the range of one half to three percent of the filter media.

6. The fuel filter of claim 4 wherein the amount of said carbon fibers in said filter media is approximately two percent.

7. The fuel filter of claim 1 wherein said filter media is not grounded.

* * * * *